June 15, 1965 W. W. ROBINSON, JR., ETAL 3,189,164
CHAIN CONSTRUCTION
Filed Nov. 21, 1963 3 Sheets-Sheet 1
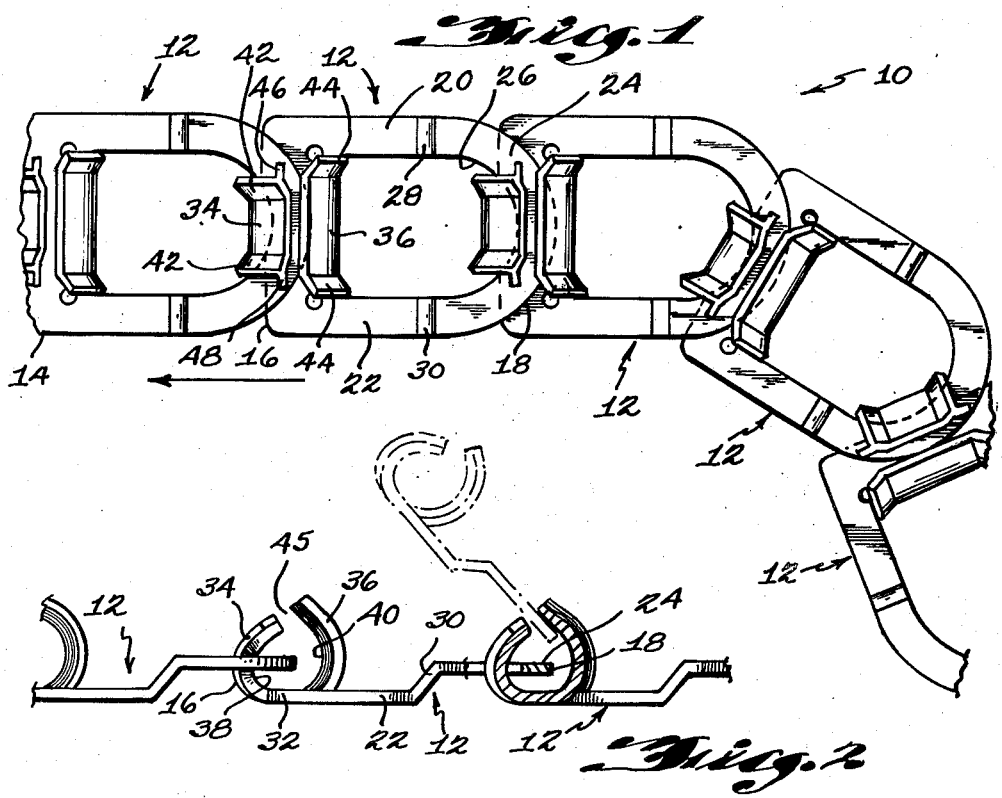
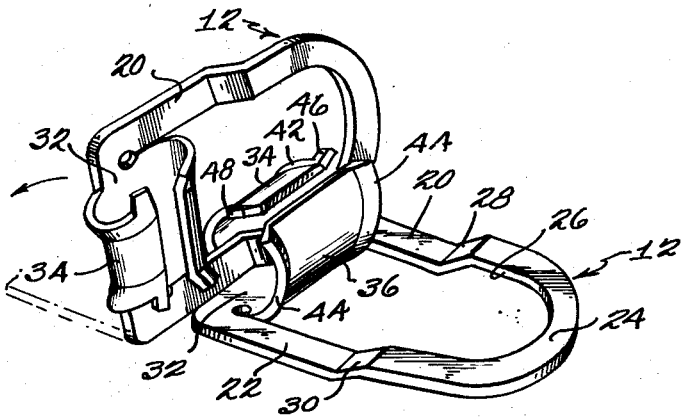
INVENTORS
WILLIAM W. ROBINSON, JR.
DEMPSIE C. CAMP
BY Cushman, Darby & Cushman
ATTORNEYS

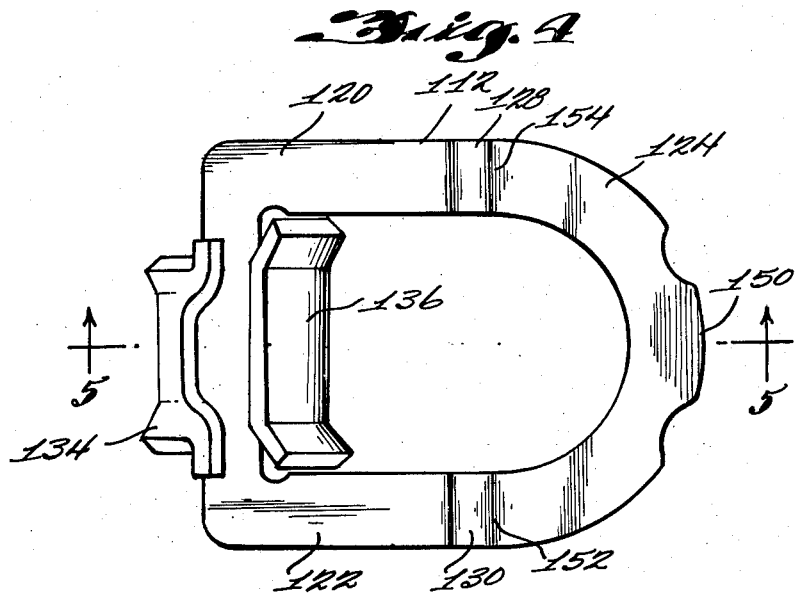
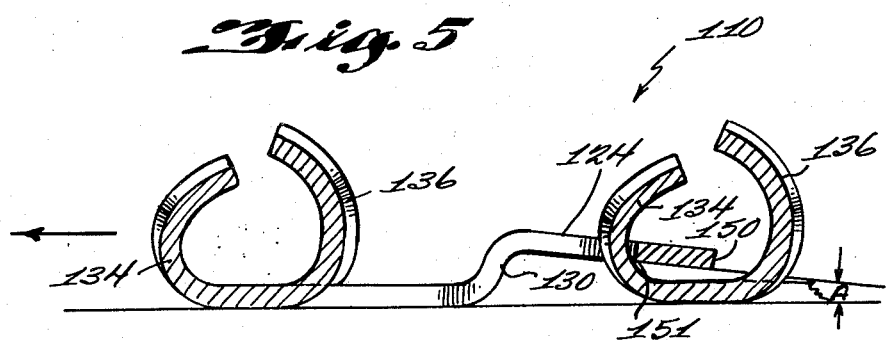
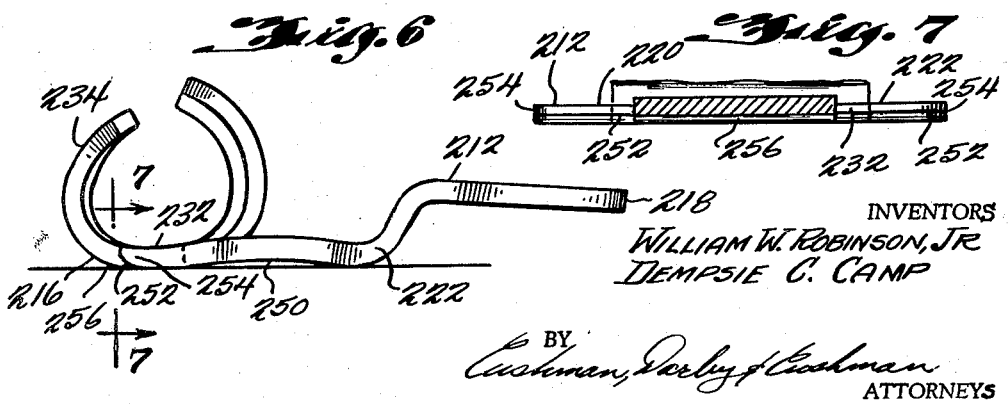

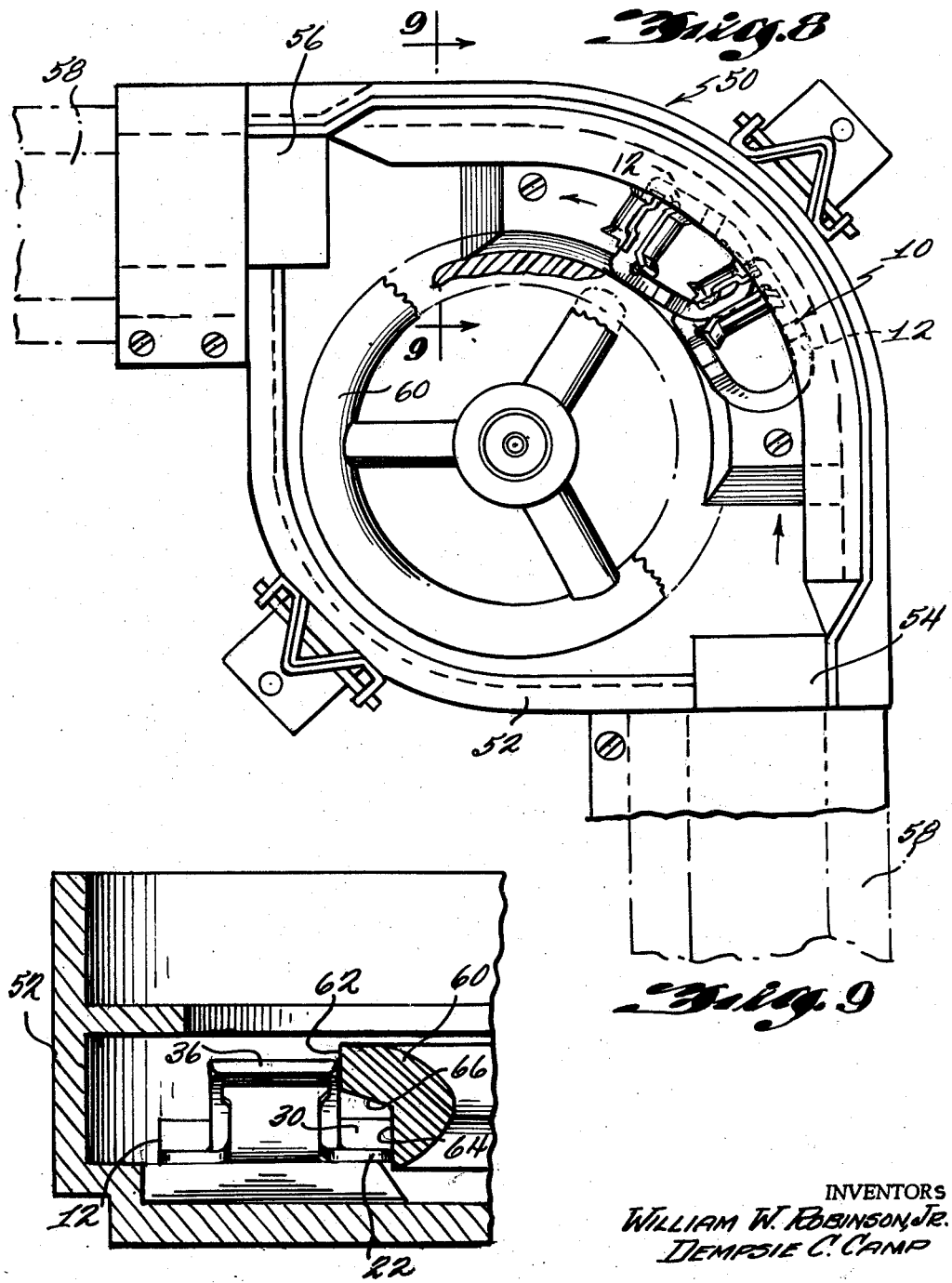

3,189,164
CHAIN CONSTRUCTION

William W. Robinson, Jr., Signal Mountain, and Dempsie C. Camp, Dunlap, Tenn., assignors to Cumberland Case Company, Chattanooga, Tenn., a corporation of Tennessee
Filed Nov. 21, 1963, Ser. No. 327,575
15 Claims. (Cl. 198—168)

This invention has reference to a new and improved sprocket chain construction for mechanical poultry feeders and the like, the chain links being operative to convey poultry feed along a feed trough.

This application is a continuation-in-part of our co-pending application Serial No. 181,584, filed March 22, 1962, now abandoned.

In such mechanical poultry feeders, the trough circuit comprises a plurality of straight lengths of trough which are arranged in a polygonal plan so as to form an endless trough circuit or loop. Each of the sides of the polygonal trough circuit may comprise a plurality of longitudinally aligned separate trough sections which are assembled by means of suitable trough connectors. The lengths of trough which comprise each side of the polygonal plan are operatively connected at their junctions by a suitable corner direction changer unit. At a suitable location along the trough circuit, a hopper is provided for feeding the feed by gravity to the moving conveying chain. The feed conveying chain is commonly driven by a sprocket wheel which is operatively secured to a drive shaft driven by a suitable power source such as an electric motor. The chain, which is supported and guided by the trough in a linear direction, is caused to laterally change direction by means of the corner direction changer units. Each corner assembly serves to flex the chain edgewise or laterally while maintaining it in its horizontal plane of movement. Such corner direction changer units generally comprise a corner housing upon which is rotatably mounted a suitable idler wheel or pulley. In effecting the lateral change of direction of the feed conveying chain, the idler pulley which is located inwardly of the turn engages the inner edge of the chain to guide and flex the chain laterally in an arcuate path.

Feed conveyor chains thus utilized in such mechanical poultry feeders must not only be capable of meeting several various operational demands but also be of a simple inexpensive, yet rugged construction. Thus, not only must these chains be effective themselves to convey feed through the trough and return the unused feed to the feed supply hopper, but they must also be of sufficiently rugged construction and of such configuration that they may be positively engaged and directly driven by a suitable drive sprocket means. At the same time such chains must be extremely flexible and of such construction that they both readily negotiate, and simultaneously convey feed through, the various changes of direction required for the efficient operation of modern poultry feeding arrangements. In addition, it is most desirable that the individual chain links be of a construction such that they may not only be quickly and easily assembled and disassembled by manual manipulation, without the necessity of utilizing special tools and equipment, but also remain in operative assembled relation during operation of the feeder. Moreover, since the feeder trough is generally constructed from relatively soft light gage sheet metal, and the feed conveyor chain, which in operation slides along the bottom of the trough, is preferably formed from heat-treated relatively hard metal chain links, shortened equipment life resulting from excessive trough wear has been a frequent problem. In order to minimize such trough wear it is desirable that each chain link contact the bottom of the trough over a substantial area rather than having only a single point or line contact therewith. Furthermore, it is most desirable that the chain remain beneath the feed being conveyed through the trough and resist the undesirable tendency to work its way on top of the feed. Such undesirable "climbing" of the chain on top of the feed results in the eventual build-up of the feed level in the trough to the point of overflow since the conveyor chain will continue to carry more feed from the supply hopper to the trough and distribute the feed in the trough rather than effectively conveying the feed throughout the trough circuit.

Additionally, it is obviously desirable that conveyor chain links be of a construction adapted to avoid engagement with irregularities in trough bottoms such as occur at the junctions of the trough sections.

In the past attempts to provide a conveyor chain construction capable of satisfying the foregoing requirements have met with only limited success. In general, such prior art efforts have resulted in a relatively complex cumbersome chain link construction which was not only expensive to manufacture and difficult to assemble, but also did not adequately meet the aforementioned functional requirements.

Accordingly, a principal object of the present invention is to provide an improved feed conveyor chain construction.

Another object of the present invention is to provide an improved feed conveyor chain construction particularly adapted for use in conveying feed or the like in a mechanized poultry feeder.

A further object of the present invention is to provide a feed conveyor chain which is not only particularly adapted to meet the various functional requirements of a mechanized poultry feeder but is of an inexpensive, simple, yet rugged construction.

Another object of the present invention is to provide an improved feed conveyor chain which is easily assembled and disassembled by manual manipulation without the necessity of special tools or equipment.

A still further object of the present invention is to provide a feed conveyor chain comprised of links having a construction which facilitates both the lateral changes of directions in the conveying movement of such chain and also the feed conveying function of the chain.

An additional object of the present invention is to provide a feed conveyor chain comprised of links having a construction adapted to resist the tendency of the chain to work its way on top of the feed.

Another object of the present invention is to provide a feed conveyor chain comprised of links having a construction adapted to avoid engagement with irregularities occurring in the supporting surface.

Further objects of this invention include the provision of a sprocket chain: which is of inexpensive stamped, one-piece construction; which is utterly reliable and trouble-free in operation; which meets the demands of mechanized poultry feeders, conveying the feed in a manner analogous to "flowing water" by virtue of the geometrically stable bi-planar construction of the links.

These and still further objects, advantages, and novel features of the present invention will become apparent in the specification and claims, taken in connection with the accompanying drawing.

In the drawing:

FIGURE 1 is a plan view of a chain formed of links according to this invention;

FIGURE 2 is a side elevation view, partly in section, of the chain shown in FIGURE 1;

FIGURE 3 is a perspective view showing two adjacent links in an intermediate stage of assembly;

FIGURE 4 is a plan view showing a modified form of the present invention;

FIGURE 5 is a view in section, taken along the line 5—5 of FIGURE 4;

FIGURE 6 is a side elevational view showing another modified form of the present invention;

FIGURE 7 is a sectional view taken along the line 7—7 of FIGURE 6;

FIGURE 8 is a top plan view showing a chain formed of links according to this invention operatively associated with a corner direction changer unit; and FIGURE 9 is an enlarged fragmentary sectional view of the invention taken along the line 9—9 of FIGURE 8 showing the cooperation between a link of the chain and the direction changer idler pulley.

According to one feature of this invention, there is provided a feed conveyor chain composed of links having a bi-planar configuration. The link includes spaced apart and parallel side members merging at the rearward ends in a symmetrically curved pintle. The side members are disposed in a lower supporting plane, while the pintle is disposed in another plane, above and parallel or preferably slightly inclined to this lower supporting plane. Means for loosely receiving the pintle of an adjacent link are carried at the forward ends of the side members, the link being operative for stable support solely by the lower supporting plane.

According to another novel feature of this invention, there is provided a chain constructed of bi-planar links, the leading end of each link carrying upwardly extending forward and rear pintle-receiving members having transversely extending concave facing surfaces. The side ends of these members flare outwardly, and the forward member carries transversely extending lugs for retaining the pintle of the adjacent link. By virtue of this arrangement, the links are easily assembled in loose engagement by simple manual manipulation, and are positively retained, after assembly in a notably superior manner.

Referring now particularly to FIGURES 1, 2 and 3 of the accompanying drawings, there is shown a poultry feed chain 10 composed of links 12 according to this invention.

Each link 12 includes a body 14 of one-piece plate construction, having a leading end 16 and a trailing end 18. When viewed in plan, the link body 14 is of generally U-shaped configuration, having spaced apart and parallel side members 20, 22 merging at their rearward ends with a symmetrically curved pintle 24. The side members 20, 22 and pintle 24 define a U-shaped central opening 26 for receiving sprocket teeth (not shown), the exterior edges of this body 14 being symmetrically U-shaped with respect to the opening 26.

Spaced in lateral alignment along the body 14 are intermediate portions 28 and 30, which extend angularly upwardly and rearwardly from the rearward ends of the side members 20 and 22, respectively. These intermediate portions 28 and 30 are operative to position the pintle 24 in a plane above and substantially parallel to the plane of the side members 20, 22 forward of the intermediate portions 28 and 30, respectively.

By virtue of this arrangement, it can be seen that the link 12 is of bi-planar construction, having a lower supporting plane defined by the side members 20 and 22, and an upper plane defined by the pintle 24. Advantageously, the link 12 is constructed by virtue of its weight distribution so that the body 14 is stably supported on a surface solely along this lower supporting plane.

A forward end member 32 is joined to the front ends of the side members 20 and 22 and lies in their common plane. This forward end member 32 carries front and rear pintle-receiving members 34 and 36, respectively, which extend freely upward in longitudinally opposite directions. These members 34 and 36 have transversely extending concave, facing surfaces 38 and 40, respectively, the arc of the front member 34 being smaller than the arc of the rear member.

The sides of the pintle-receiving members 34 and 36 flare outwardly at 42 and 44, respectively, and are constructed to receive in a loose fashion the pintle 24 of an adjacent link. In this regard, the pintle-receiving members 34 and 36 have a narrow, angularly extending lateral slot 45 between the open ends, and the front pintle-receiving member 34 has transversely extending lugs 46 and 48 extending laterally from the outwardly flaring ends thereof. These lugs 46 and 48 have an extent slightly less than the lateral extent of the rear pintle-receiving member 36, and also a sufficient length to assume an axially transverse position (FIGURE 3), for reasons to become apparent. The remaining lateral extent of the front pintle-receiving member 34 is substantially less than the width of the U-shaped opening 26 so that the lugs 46 and 48 are operative to engage the pintle 24 of the adjacent link.

By virtue of the configuration of the forward pintle-receiving member 34, and the longitudinal distance between the concave surfaces 38 and 40, a loose connection is formed, with the adjacent link being able to twist freely laterally when so assembled. Also, the forwardmost extent of the front concave surface 38 corresponds to the elevation of the upper plane of the pintle 24 relative to the lower supporting plane.

The links are quickly and easily assembled to form a chain as follows: one link is angularly inclined to the horizontal and the pintle 24 of this link is inserted into the slot 45 of the adjacent link (as shown in phantom lines, FIGURE 2). This link is then rotated in this angularly inclined plane so that one side member is aligned with the forward end member 32, as shown in FIGURE 3. Only when the links have this relationship can the one link be pivoted downwardly so as to be retained by the front and rear pintle-receiving members 34 and 36. When in this position, of course, the axis of the link being inserted is horizontally turned about 90° to the axis of the adjacent link. The link being inserted is then simply rotated laterally at 90° to align its pintle 24 beneath the lugs 46 and 48.

The links are disassembled by following these steps in opposite sequence, as is apparent. During travel of the chain along a predetermined path, the lateral twist of the links is limited by the engagement of either intermediate portion 28 or 30 with the forward end member 32.

Referring now to FIGURES 4 and 5 of the drawings, there is shown a modified feed conveyor chain 110 composed of links 112 embodying the invention. The construction of the links 112 differs from that of the links 12, just described, in that the pintle 124 lies in a plane which is slightly inclined at an angle A to the plane of the side members 120 and 122. As best seen in FIGURE 5, the plane of the pintle portion 124 slopes downwardly toward the plane of the side members 120 and 122 as it extends rearwardly from the intermediate members 128 and 130. The angle A between the plane of the pintle portion 124 and the plane of the side members 120 and 122 is small, angles in the range of 4° to 7° being found most satisfactory in practice. The inside lower edge 151 of the U-shaped pintle portion will be seen to be slightly below the forwardmost extent of the front pintle-receiving member 134. When a chain comprised of links having the modified construction, just described, is placed under tension, a slight upwardly directed pressure will be exerted on the inclined pintle portion 124 forming the trailing end of each link. Such upwardly directed pressure will cause the leading end of each link to be urged downwardly. As a result of such downward pressure being exerted on the leading end of each link, any tendency of the chain to "climb" or work its way on top of the feed will be resisted and the substantially planar contact between the floor of the trough and the side members 120 and 122 is ensured.

Reference is now made to FIGURES 6 and 7 of the drawings wherein there is shown another modified chain link 212 embodying the invention. The construction of the chain link 212 differs from that of the chain link 112, just described, in that each side member 220 and 222 is provided with a slight upward curvature intermediate the longitudinal extent thereof, as shown at 250, and the lower portion of the leading edge of the forward end member 232 is provided with laterally extending beveled portions forming angularly inclined leading end surfaces 252 on each side of the front pintle-receiving member 234.

The provision of the slight upwardly curved portion 250 on each of the side members 220 and 222 further improves the resistance of the chain to working its way on top of the feed. Since the curvature 250 is relatively slight, there will be substantial planar contact between the lowermost planar surfaces of the side members 220 and 222 and the floor of the trough.

The angularly inclined surfaces 252 formed on the lower portion of the leading edge of the forward end member 232 extend downwardly from the leading end 216 of the link 212 toward the trailing end 218 thereof. As best seen in FIGURE 7, the angularly inclined surfaces 252 extend laterally from each side of the junction of the front pintle-receiving member 234 with the forward end member 232 to the corresponding side edges 254 of the forward end member. It should also be noted that the forwardly facing upwardly extending curved surface 256 formed by the junction of the front pintle-receiving member 234 with the forward end member 232 provides a lower leading edge portion laterally intermediate angularly inclined surfaces 252 having an angular inclination substantially similar to that of the inclined surfaces 252.

Thus, it will be seen that the lower portion of the leading end 216 of the link 212 will present to the floor of the trough an angularly inclined lower leading edge formed by the surfaces 252 and 256. It will be apparent that such an angularly inclined lower leading edge surface largely eliminates the undesirable tendency of the chain to engage irregularities in the floor of the trough such as occur at the junction of trough sections.

Referring now to FIGURES 8 and 9 of the drawings, there is shown a feed conveying chain 10 formed of links 12 according to the instant invention operatively associated with a corner direction changer unit 50 of the type disclosed in our commonly assigned copending application, Serial No. 253,796, filed January 25, 1963, now U.S. Patent No. 3,157,273. The corner direction changer unit generally includes an idler pulley housing 52 having an entrance channel 54 and an exit channel 56 adapted to receive and support the ends of sections of feed trough 58. An idler pulley 60, rotatably mounted on the housing 52, is adapted to operatively engage the chain 12 so as to effect a lateral change of direction in the movement of the chain. As best seen in FIGURE 8, the outer periphery of the idler pulley 60 includes a pair of vertically spaced, generally vertical chain engaging surfaces 62 and 64 separated from each other by an upwardly and outwardly projecting transition surface 66. The lower chain engaging surface 64, being the one of lesser diameter, engages the side member 22 and intermediate portion 30 which are the wider and lower portions of the chain link 12. The upper chain engaging surface 62, being that of greater diameter, engages the side of the rear pintle-receiving member 36 which is the upper and narrower portion of the chain link 12.

Thus, it is clear that the idler pulley which is located inwardly of the turn and about which the chain effects its turn, contacts each link at vertically spaced points thereby maintaining the chain in a stable horizontal plane and eliminating any tendency to roll or flip out of the horizontal plane of movement and disengage the idler pulley. Furthermore, by maintaining the chain in its horizontal plane of movement, the tendency of feed to accumulate beneath the chain at the corner units is effectively eliminated.

From the foregoing description of the various embodiments of this invention, it is evident that the objects and practical advantages enumerated hereinabove are effectively accomplished. The wide and high rear pintle-receiving member is not only an effective feed conveying means, but provides an effective means for accomplishing reentry or return of unused feed to the feed supply hopper. The feed in the feed supply hopper tends to resist the reentry of unused feed and with conventional conveyor chains, there will be a backing up of unused feed at the reentry port of the supply hopper with a resulting build-up of feed to the point where it overflows the trough. By utilizing a conveyor chain comprising links constructed according to the instant invention, the relatively high and wide rear pintle-receiving member not only effects a firm packing of the unused feed but is most effective in clearing a path for the feed carried on the link immediately behind it and thus is extremely effective in overcoming the aforementioned resistance to reentry and preventing wasteful feed overflow. Furthermore, the high, wide and strong rear pintle-receiving portion provides an excellent bearing surface for engagement with the teeth of a suitable drive sprocket. In addition, a relatively large planar contact surface is provided between the link and the floor of the trough, distributing the weight of the chain over a relatively large area and thereby increasing equipment life by reducing trough wear. Moreover, by utilizing the novel bi-planar link construction of the instant invention, the turning characteristics of the conveyor chain are considerably enhanced. The links will remain in their horizontal plane of movement in contact with the support surface and not tend to twist relative to one another and rise from the support surface, as is characteristic of links embodying a single plane construction.

It will be realized, however, that various changes and substitutions may be made to the specific embodiments disclosed herein for the purpose of illustrating the principles of this invention without departing from these principles. Therefore, while the present invention has been described with particular reference to the specific forms shown in the drawings, it is to be understood that such is not to be construed as imparting any limitations upon this invention, which includes all modifications encompassed within the spirit and scope of the following appended claims.

We claim:

1. A feed conveyor chain constructed of one-piece links, each link comprising: a body having a leading end and a trailing end, said body including transversely spaced apart longitudinally extending parallel side members and a symmetrically curved pintle providing a U-shaped central opening in plan, and the outer edge of said side members and said pintle having a symmetrically disposed U-shaped configuration relative to said central opening, said side members having upwardly inclined, rearwardly extending intermediate portions in lateral alignment at the rearward ends thereof, at least portions of the lowermost surface of each of said side members forward of said intermediate portions being in a generally flat common lower supporting plane and said pintle at the rearward end of said intermediate portions being in another substantially flat plane extending above said lower support plane, a transversely extending forward end member joined to the forward extremities of said side members, the lowermost surface of said forward end member being disposed in said lower supporting plane, and pintle-receiving means joined to said forward end member for receiving the pintle of an adjacent link, said pintle-receiving means including longitudinally spaced apart front and rear pintle-receiving members extending freely upwardly from said forward end member to heights greater than the height of the plane of said pintle, said pintle-receiving members having transversely extending concave facing surfaces, said rear pintle-receiving member having a uniform transverse width substantially equal to the transverse distance between the inner edges of said side members and the forwardmost extent of the concave front pintle-receiving member having a transverse extent substantially less than the transverse extent of said rear pintle-receiving member.

2. A chain constructed of one-piece plate links as set forth in claim 1 wherein said front pintle-receiving member of each link includes transversely extending lugs at the upper free ends thereof, said lugs having a sufficient transverse extent so as to extend over the curved pintle portion of the preceding coupled link during the relative lateral operating movement of said preceding coupled link.

3. A chain constructed of one-piece plate links as set forth in claim 1 wherein each of said side members is provided with a slight upward curvature intermediate its forward extremity and rearward end.

4. A chain constructed of one-piece plate links as set forth in claim 3 wherein said leading end of each link is provided with a forwardly facing surface generally defining a plane downwardly inclined toward said trailing end relative to said lower supporting plane.

5. A feed conveyor chain constructed of one-piece plate links, each link comprising: a body having a leading end and a trailing end, said body including transversely spaced apart longitudinally extending parallel side members and a symmetrically curved pintle providing a U-shaped central opening in plan, and the outer edges of said side members and said pintle having a symmetrically disposed U-shaped configuration relative to said central opening, said side members having upwardly inclined, rearwardly extending intermediate portions in lateral alignment at the rearward ends thereof, the lowermost surface of each of said side members forward of said intermediate portions being in a generally flat common lower supporting plane and said pintle at the rearward end of said intermediate portions being in another plane above and substantially parallel to said lower supporting plane, a transversely extending forward end member joined to the forward extremities of said side members, the lowermost surface of said forward end member being disposed in said lower supporting plane, and pintle-receiving means joined to said forward end member for receiving the pintle of an adjacent link, said pintle-receiving means including longitudinally spaced apart front and rear pintle-receiving members extending freely upwardly from said forward end member to heights greater than the height of the plane of said pintle, said pintle-receiving members having transversely extending concave facing surfaces, said front pintle-receiving member having a smaller concave arc than said rear pintle-receiving member, said rear pintle-receiving member having a uniform transverse width substantially equal to the transverse distance between the inner edges of said side members, the forwardmost extent of the concave front pintle-receiving member being in the plane of said pintle and having a transverse extent at said forwardmost extent substantially less than the transverse extent of said rear pintle-receiving member.

6. A chain constructed of one-piece plate links as set forth in claim 5 wherein said front pintle-receiving member of each link includes transversely extending lugs at the upper free ends thereof, said lugs having a sufficient transverse extent so as to extend over the curved pintle portion of the preceding coupled link during the relative lateral operating movement of said preceding coupled link.

7. A chain constructed of one-piece plate links as set forth in claim 5 wherein each of said side members is provided with a slight upward curvature intermediate its forward extremity and rearward end.

8. A chain constructed of one-piece plate links as set forth in claim 7 wherein said leading end of each link is provided with a forwardly facing surface generally defining a plane downwardly inclined toward said trailing end relative to said lower supporting plane.

9. A feed conveyor chain constructed of one-piece plate links, each link comprising: a body having a leading end and a trailing end, said body including transversely spaced apart longitudinally extending parallel side members and a symmetrically curved pintle providing a U-shaped central opening in plan, and the outer edges of said side members and said pintle having a symmetrically disposed U-shaped configuration relative to said central opening, said side members having upwardly inclined, rearwardly extending intermediate portions in lateral alignment at the rearward ends thereof, at least portions of the lowermost surface of each of said side members forward of said intermediate portions being in a generally flat common lower supporting plane and said pintle at the rearward end of said intermediate portions being in another plane above, and downwardly inclined toward said trailing end relative to said lower supporting plane, a transversely extending forward end member joined to the forward extremities of said side members, the lowermost surface of said forward end member being disposed in said lower supporting plane, and pintle-receiving means joined to said forward end member for receiving the pintle of an adjacent link, said pintle-receiving means including longitudinally spaced apart front and rear pintle-receiving members extending freely upwardly from said forward end member to heights greater than the height of the plane of said pintle, said pintle-receiving members having transversely extending concave facing surfaces, said front pintle-receiving member having a smaller concave arc than said rear pintle-receiving member, said rear pintle-receiving member having a substantially uniform transverse width substantially equal to the transverse distance between the inner edges of said side members, the forwardmost extent of the concave front pintle-receiving member being slightly above the plane of said pintle and having a transverse extent at said forwardmost extent substantially less than the transverse extent of said rear pintle-receiving member.

10. A chain constructed of one-piece plate links as set forth in claim 9 wherein said front pintle-receiving member of each link includes transversely extending lugs at the upper free ends thereof, said lugs having a sufficient transverse extent so as to extend over the curved pintle portion of the preceding coupled link during the relative lateral operating movement of said preceding coupled link.

11. A chain constructed of one-piece plate links as set forth in claim 9 wherein each of said side members is provided with a slight upward curvature intermediate its forward extremity and rearward end.

12. A chain constructed of one-piece plate links as set forth in claim 11 wherein said leading end of each link is provided with a forwardly facing surface generally defining a plane downwardly inclined toward said trailing end relative to said lower supporting plane.

13. A chain constructed of one-piece plate links as set forth in claim 1, wherein the longitudinally spaced apart front and rear pintle receiving members provide an angularly extending lateral slot between the upper free ends of the front and rear pintle receiving members, said slot being adapted to receive the pintle of one link angularly inclined to the longitudinal axis of the body of the link so that the individual links may be assembled and disassembled by manual manipulation without distortion of the pintle receiving means.

14. A chain constructed of one-piece plate links as set forth in claim 5, wherein the longitudinally spaced apart front and rear pintle receiving members provide an angularly extending lateral slot between the upper free ends of the front and rear pintle receiving members, said slot being adapted to receive the pintle of one link angularly inclined to the longitudinal axis of the body of the link so that the individual links may be assembled and disassembled by manual manipulation without distortion of the pintle receiving means.

15. A chain constructed of one-piece plate links as set forth in claim 9, wherein the longitudinally spaced apart front and rear pintle receiving members provide an angularly extending lateral slot between the upper free ends of the front and rear pintle receiving members, said slot being adapted to receive the pintle of one link angularly inclined to the longitudinal axis of the body of the link so that the individual links may be assembled and disassembled by manual manipulation without distortion of the pintle receiving means.

References Cited by the Examiner
UNITED STATES PATENTS

| | | | |
|---|---|---|---|
| 2,672,059 | 3/54 | Graetz et al. | 74—248 |
| 2,811,857 | 11/57 | Willauer et al. | 74—250 |
| 3,015,380 | 1/62 | McAuley | 74—249 X |

SAMUEL F. COLEMAN, *Acting Primary Examiner.*